J. A. BENNETT.
WIND WHEEL.
APPLICATION FILED SEPT. 20, 1911.
1,037,854.
Patented Sept. 10, 1912.
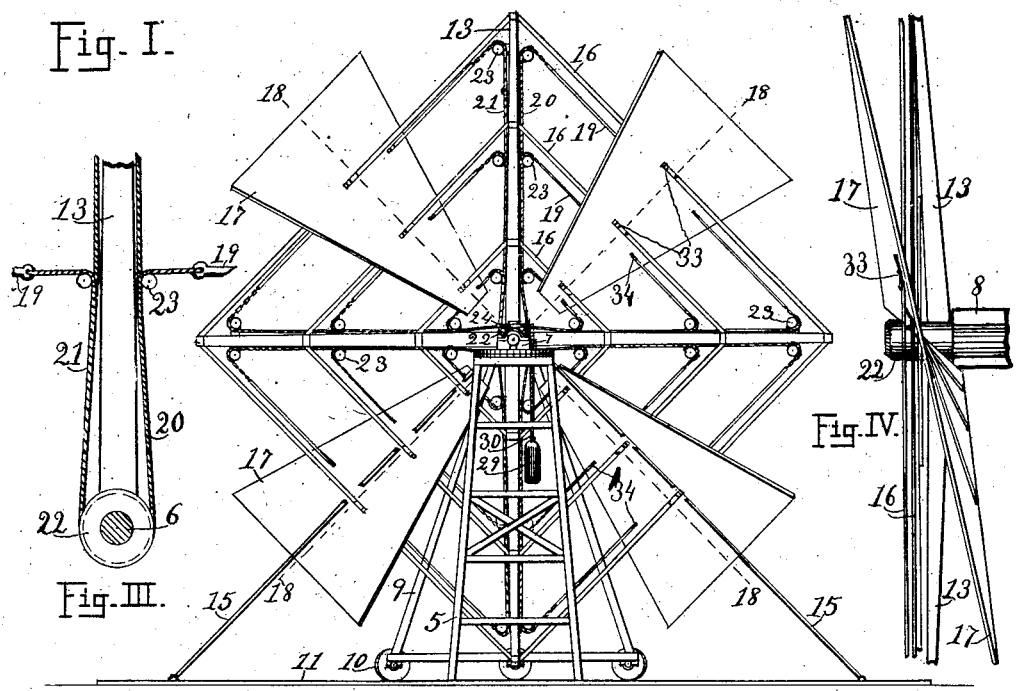
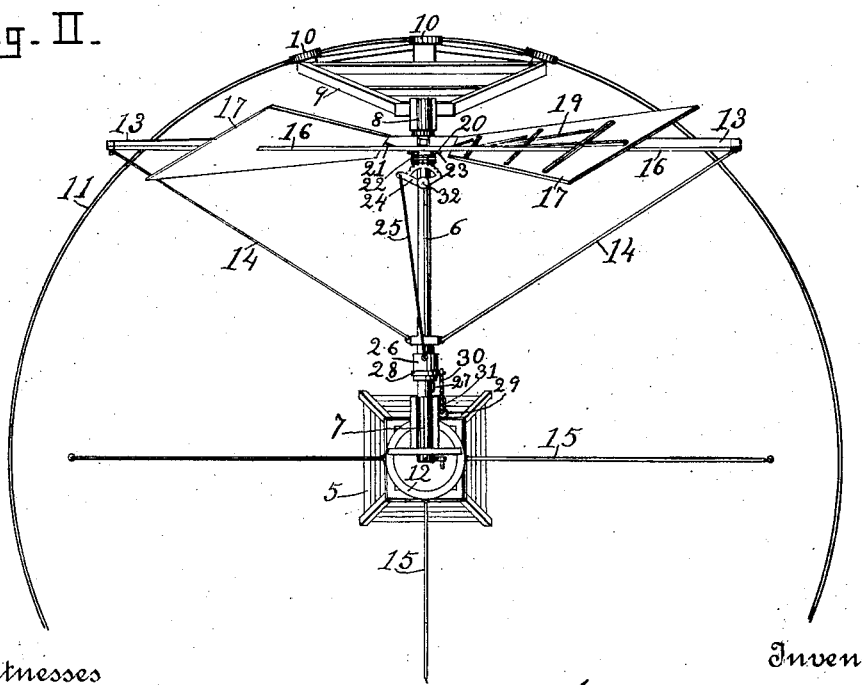
Witnesses
N. S. Waller.
D. E. Waller
Inventor
Judson A. Bennett,
by W. X. Stevens.
Attorney

UNITED STATES PATENT OFFICE.

JUDSON A. BENNETT, OF CLOVIS, NEW MEXICO.

WIND-WHEEL.

1,037,854.  Specification of Letters Patent.  Patented Sept. 10, 1912.

Application filed September 20, 1911. Serial No. 650,403.

*To all whom it may concern:*

Be it known that I, JUDSON A. BENNETT, a citizen of the United States, residing at Clovis, in the county of Curry and State of New Mexico, have invented certain new and useful Improvements in Wind-Wheels, of which the following is a specification.

This invention relates to wind wheels of the vertical, feathering blade class, and its main object is to adapt each blade to automatically assume a spiral form of more or less twist according to the force of the wind, in order that each blade may have the same screw thread pitch throughout its radial length, thus receiving the same degree of propelling force from the wind over the whole area of the wheel.

To this end my invention consists in the construction and combination of parts forming a wind wheel hereinafter more fully described and particularly stated in the claims, reference being had to the accompanying drawings, in which:

Figure I is an inner face view of a wind wheel according to my invention. Fig. II is a top view of the same. Fig. III, is a detail view of the pinion and blade-actuating cords. Fig. IV, is an outer end view of a single blade and some of the adjacent parts to show the blade when twisted.

Numeral 5 represents a vertical tower or derrick upon the top of which one end of the wheel shaft 6 is journaled to rotate in a bearing 7; this bearing being mounted for horizontal rotation on a bearing 12 on the tower. The outer end of the wheel shaft is journaled in a bearing 8, which is mounted on a truck 9, having wheels 10 which roll upon a circular track 11 that is located upon the ground concentric with the central bearing 12. A series of arms 13 are radially fixed to shaft 6, and these arms are stayed by braces 14 connecting with the shaft. Guys 15 may extend from the top of the tower to the ground to brace the tower. Rods 16 are rigidly fixed to the arms 13 as chords of concentric circles, and upon these rods the blades 17 are mounted between the arms 13. The rods pass through the blades at points between the radial center 18 of each blade and its front edge, and hinges 33 connect the blades with the ribs as hangers. Another series of ribs 19 are hinged at 34 to the blades to the rear of their central line and are connected by cords or chains 20, 21, passing over pulleys 23, with a pinion 22 that is mounted to rotate upon the shaft 6. An elbow lever 24 pivoted to the shaft at 32 and provided with a segment of teeth that engage the pinion 22, is connected by a rod 25 with a sleeve 26 that is mounted to reciprocate longitudinally upon the shaft 6, and is driven to revolve therewith by a spline 27. A ring 28, mounted to revolve upon the sleeve and to reciprocate therewith, is connected with a weight 29, by a cord or chain 30 that passes over a pulley 31 that is mounted on the bearing 7. When the wind blows it will swing the wheel upon the track 11 until the shaft 6 points its inner end to the wind which then has the full breadth of the wheel to act upon. The bearings of the shaft 6, being at its extreme ends, permit stay braces 14 upon the wheel, and 15 upon the tower; and with the truck 9 upon the circular track 11, supporting the outer end of the wheel shaft, this combination is adapted to endure the severest winds.

The weight 29, acting through the cord 21 and other connections, holds the blades normally nearly in the plane of the wheel, offering a broad surface for the action of light winds; but as the wind increases the blades will be feathered more and more into the line of it against the resistance of the weight 29. Now, to carry out my full idea of spirally feathering the blades, I locate the operating rods 19 at distances from the adjacent hanging rods 16 in inverse proportion to the twist desired at each hanging rod, the amount of motion given by the cords 20, 21 being the same at all the rods. The distance between the rods 16 and 19 at the inner circle being less than the corresponding distance at the other circle, a pull upon the cord 21 will give greater twist to the inner ends of the blades than to the outer ends. For example, if the cord 21 were pulled forward six inches it would pull the next rear cord 20, forward that distance, and the two cords connecting the blades around the whole wheel, and working around the pinion 22, act as one cord. In fact, all the cords might be joined as one where they go around the pinion. Whatever the pitch of the wheel may be, the twist of the blades is one-half as much at the circumference as at one-half the radius like the thread in a true screw. This united action of the cords produce a gain in each blade twist from circumference toward center, forming a constant screw pitch throughout the length of the blade. The weight 29 and connections may be substituted by any equivalent resistance to the feathering of the blades by the wind. The cords 20 oppose the action of the cords 21 merely to keep the rear edge of the blades from fluttering in the wind. The screw pitch of the blades causes the wind to act with equal revolving force on the whole area of the wheel, and the varying pitch of the screw proportional to the force of wind utilizes both light breezes and heavy winds without injurious strain on the wheel at any point. One wheel may have any desired number of blades; there may be a pair of cords 20, 21 to each blade, or one pair of cords may operate a rod 19 that connects with a number of blades. While the rods 16 are necessarily stiff and rigid, the rods 19 may be substituted by cords, or other flexible connections would do their work nearly as well.

I claim—

1. In a wind wheel, a shaft journaled in bearings and arms fixed radially to the shaft; a set of rods fixed to the said arms as chords of circular arcs, one circle within another; blades hung radially, each upon fixed rods of different circles; a set of blade operating rods hung for linear motion parallel with the fixed rods, one set of rods being located forward of the other set; a weight hung from a pulley that is mounted on a bearing of the shaft; a pinion journaled to the shaft near to the said radial arms; connections running along the radial arms and communicating between the operating rods and the said pinion, and connections along the shaft between the pinion and the said weight.

2. In a wind wheel, rods fixed as chords of circles of different diameters on the face of the wheel; blades hung upon the said rods to swing to and from radial, longitudinal planes; operating rods located substantially parallel with the fixed rods and connected with the blades, the point of connection being at a greater distance from the adjacent hanging rod on the large circle than on the smaller ones; and means for giving an equal amount of motion to all the operating rods, whereby a twisting action upon the blades is produced.

3. In a wind wheel, blades hinged at different points in their radial length to the wheel; operating mechanism connected in lines of chords of circles with each blade at distances from the line of the hinges proportional to the distance of the connections from the axis of the wheel.

In testimony whereof I affix my signature in presence of two witnesses.

JUDSON A. BENNETT.

Witnesses:
J. A. BISHOP,
W. B. OLDHAM.

Copies of this patent may be obtained for five cents each, by addressing the "Commissioner of Patents, Washington, D. C."